(12) United States Patent
Imakubo

(10) Patent No.: US 6,253,561 B1
(45) Date of Patent: Jul. 3, 2001

(54) REFRIGERATOR WITH SWITCHING VALVE SWITCHING FLOW OF REFRIGERANT TO ONE OF REFRIGERANT PASSAGES

(75) Inventor: Kenji Imakubo, Ibaraki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/397,928

(22) Filed: Sep. 17, 1999

(30) Foreign Application Priority Data

Sep. 18, 1998 (JP) .................................................. 10-264856

(51) Int. Cl.$^7$ ....................................................... F25D 17/00
(52) U.S. Cl. .................................. 62/198; 62/158; 62/182
(58) Field of Search ............................... 62/198, 199, 200, 62/157, 158, 182, 180, 186, 203, 204

(56) References Cited

U.S. PATENT DOCUMENTS

| | | | |
|---|---|---|---|
| 3,359,751 | * 12/1967 | Stevens | 62/186 |
| 4,242,116 | 12/1980 | Aschberger et al. | 62/199 |
| 4,686,835 | * 8/1987 | Alsenz | 62/223 |
| 4,962,648 | 10/1990 | Takizawa et al. | 62/199 |
| 5,465,591 | 11/1995 | Cur et al. | 62/439 |
| 5,630,323 | * 5/1997 | Niijima et al. | 62/158 |

FOREIGN PATENT DOCUMENTS

| | | |
|---|---|---|
| 37 18490 | 12/1987 | (DE) . |
| 40 20 537 | 1/1992 | (DE) . |
| 0 246 465 | 11/1987 | (EP) . |

* cited by examiner

Primary Examiner—Harry B. Tanner
(74) Attorney, Agent, or Firm—Pillsbury Winthrop LLP

(57) ABSTRACT

A refrigerator includes a compressor, a condenser for liquefying a refrigerant discharged from the compressor, a plurality of refrigerant passages disposed at a downstream side of the condenser, a switching valve for switching a flow of refrigerant to one of the refrigerant passages so that the refrigerant liquefied by the condenser flows through the selected refrigerant passage, the switching valve including a valve body, and a controller for controlling the switching valve so that the switching valve performs a switching operation upon expiration of a period of time sufficient for an interior of the valve body of the switching valve to be filled with the liquid refrigerant after start of the compressor.

20 Claims, 7 Drawing Sheets

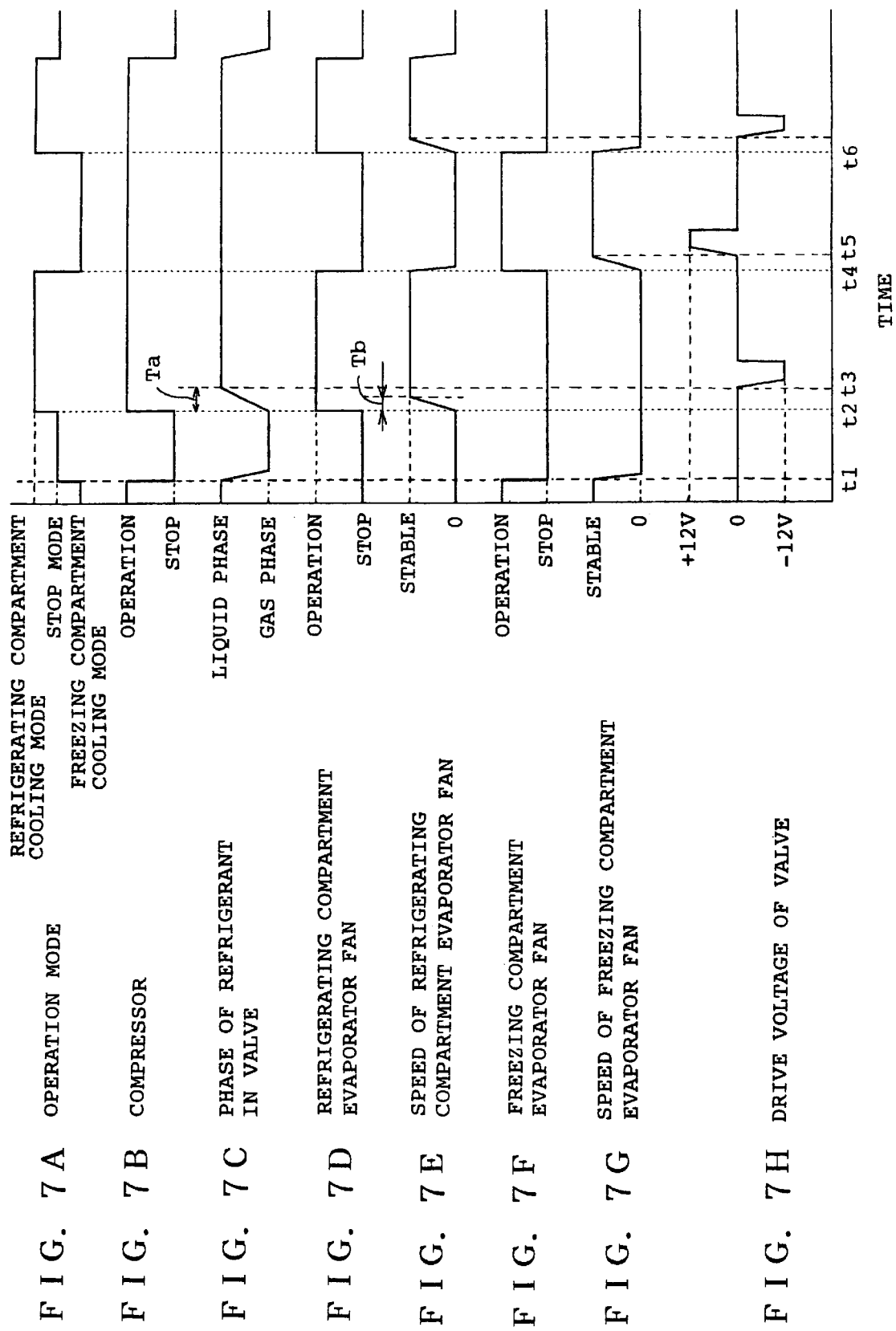

REFRIGERATOR WITH SWITCHING VALVE SWITCHING FLOW OF REFRIGERANT TO ONE OF REFRIGERANT PASSAGES

BACKGROUND OF THE INVENTION

1. Field of the Invention

This invention relates to a refrigerator provided with a switching valve for switching a flow of refrigerant to one of a plurality of refrigerant passages so that the refrigerant flows through the switched refrigerant passage.

2. Description of the Prior Art

Household refrigerators are generally installed indoors and particularly in a dwelling space. Accordingly, noise reduction has been desired in the refrigerators. Inverters have recently been employed for the purpose of reducing noise produced during operation of the refrigerator. Further, a refrigerating cycle has been improved so that a compressor is driven at low speeds. However, there have been provided refrigerators with a switching valve for switching a flow of refrigerant to one of a plurality of refrigerant passages so that a refrigerant flows through the switched refrigerant passage. The switching valve also produces noise due to a switching operation.

The noise due to the switching operation of the switching valve is produced in the following manner. The switching valve comprises an electromagnetic valve, for example. The electromagnetic valve includes a solenoid producing an attractive force upon energization. When subjected to the attractive force, a valve element of the electromagnetic valve is moved to the side of an attracting element against an urging force of urging means. When the solenoid is deenergized, the urging force moves the valve element in the direction opposite to the attracting element. Thus, a passage of a fluid is opened and closed, or a flowing direction of the fluid is switched.

The valve element of the electromagnetic valve is attracted by the attracting element in a short period of time when a predetermined drive voltage is applied to the solenoid. In this case, the valve element forcibly collides with the attracting element. As a result, a relatively large noise due to the collision is produced at a location away 5 cm from the electromagnetic valve. This noise ranges between 80 and 90 dB (A). The noise produced by the switching valve results from the above-mentioned noise due to the collision of the valve element. The switching valve is often operated according to controlled temperatures in refrigerating and freezing compartments, for example. Moreover, the noise due to the switching operation is relatively louder. Consequently, the noise due to the switching operation of the switching valve is offensive or abnormal to ears of a user.

SUMMARY OF THE INVENTION

Therefore, an object of the present invention is to provide a refrigerator in which the noise produced by the switching valve switching the flow of refrigerant to one of the refrigerant passages can be reduced.

The present invention provides a refrigerator comprising a compressor, a condenser for liquefying a refrigerant discharged from the compressor, a plurality of refrigerant passages provided at a downstream side of the condenser, a switching valve switching a flow of the refrigerant to one of the refrigerant passages so that the refrigerant liquefied by the condenser flows through the switched refrigerant passage, the switching valve including a valve body, and a controller controlling the switching valve so that the switching valve performs a switching operation upon expiration of a period of time sufficient for an interior of the valve body of the switching valve to be filled with the liquid refrigerant after start of the compressor.

According to the above-described construction, the controller controls the switching valve so that the switching valve performs the switching operation upon expiration of a period of time sufficient for an interior of the valve body of the switching valve to be filled with the liquid refrigerant after start of the compressor. As a result, the refrigerant in the liquid phase serves as a buffer against the movement of the valve element. This reduces a force of the valve element colliding with the attracting element provided in the valve body, thereby reducing the noise due to the switching operation of the switching valve.

The invention also provides a refrigerator comprising a compressor, a condenser for liquefying a refrigerant discharged from the compressor, a plurality of refrigerant passages provided at a downstream side of the condenser, a switching valve switching a flow of the refrigerant to one of the refrigerant passages so that the refrigerant liquefied by the condenser flows through the switched refrigerant passage, the switching valve including a valve body, an evaporator provided across the refrigerant passages to evaporate the liquid refrigerant, a fan for supplying a cold air produced by the evaporator, and a controller controlling the switching valve so that the switching valve performs a switching operation upon expiration of a predetermined period of time after start of the compressor or during operation of the fan.

According to this construction, the controller controls the switching valve so that the switching valve performs the switching operation upon expiration of a predetermined period of time after start of the compressor or during operation of the fan. As a result, the noise due to the switching operation of the switching valve is masked by a background noise such as a sound due to the operation of the compressor or the fan (for example, wind whistle). Consequently, the noise due to the switching operation of the switching valve can be prevented from being accepted as an offensive or abnormal noise to the ears of the user.

BRIEF DESCRIPTION OF THE DRAWINGS

Other objects, features and advantages of the present invention will become clear upon reviewing of the following description of the preferred embodiment, made with reference to the accompanying drawings, in which:

FIGS. 7A to 7H are timing charts showing a switching timing of the electromagnet valve.

DETAILED DESCRIPTION OF THE PREFERRED EMBODIMENT

Figure 2:
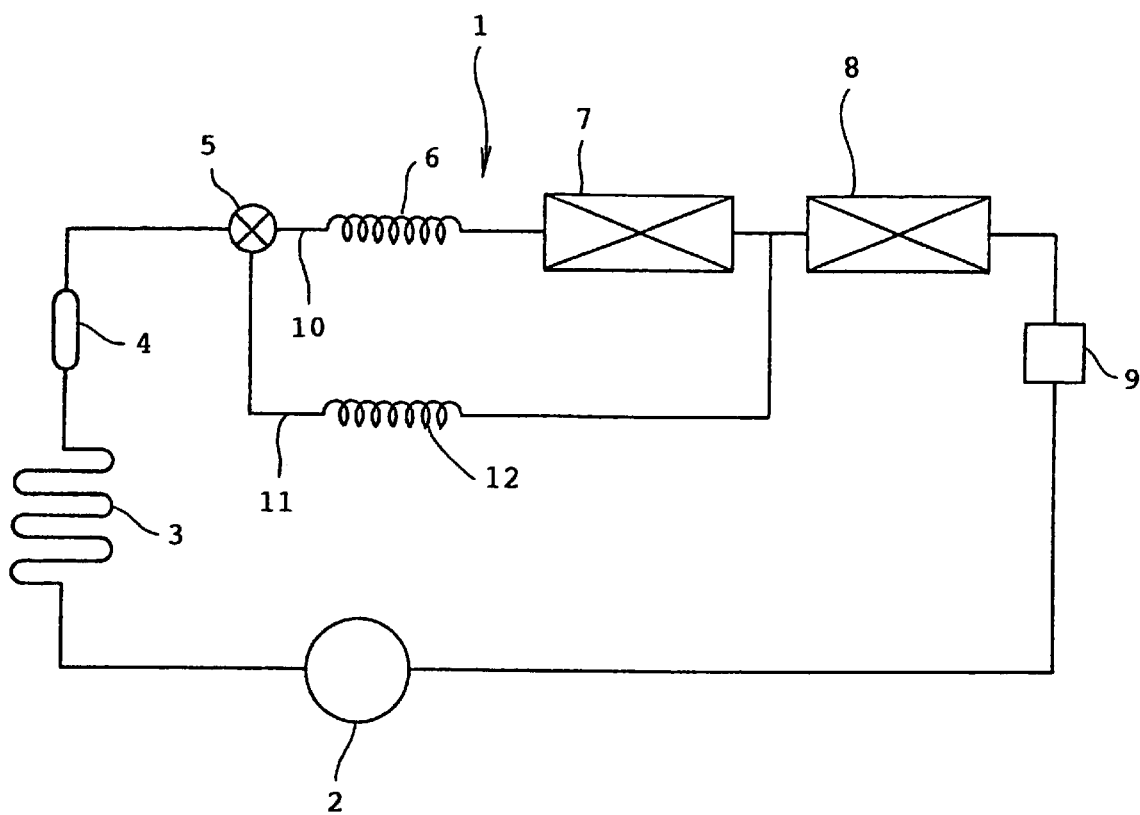
FIG. 2 illustrates an arrangement of equipment constituting a refrigerating cycle.

One embodiment of the present invention will be described with reference to the accompanying drawings. In the embodiment, the invention is applied to a refrigerator with a refrigerating cycle including an electromagnetic three-way valve. Referring first to FIG. 2, the refrigerating cycle of the refrigerator is shown. The refrigerating cycle 1 includes a compressor 2, a condenser 3, a drier 4, an electromagnetic three-way valve 5 serving as a switching valve, a first capillary tube 6 connected to a first outlet pipe of the electromagnetic valve 5, a refrigerating compartment evaporator 7, a freezing compartment evaporator 8, and an accumulator 9, all of which are connected via refrigerant flow pipes to one another so as to form a closed loop. A second capillary tube 12 is also connected via a refrigerant flow pipe 11 to a second outlet pipe of the electromagnetic valve 5 so as to be parallel with the first capillary tube 6 and the refrigerating compartment evaporator 7.

A gaseous refrigerant is discharged from the compressor 2 and liquefied when flowing through the condenser 3. When a refrigerant flow passage in the electromagnetic valve 5 has been switched to a first outlet side, the liquid refrigerant flows through a first refrigerant passage including the first capillary tube 6, the refrigerating compartment evaporator 7 and the freezing compartment evaporator 8, returning to the compressor 2. This control mode of flow of the refrigerant is referred to as "refrigerating compartment cooling mode." In the refrigerating compartment cooling mode, the liquid refrigerant is supplied mainly to the refrigerating compartment evaporator 7 for evaporation so that a cooling air for cooling an atmosphere in a refrigerating compartment is produced.

On the other hand, when the refrigerant flow passage in the electromagnetic valve 5 has been switched to a second outlet side, the liquid refrigerant flows through a second refrigerant passage including the second capillary tube 12 and the freezing compartment evaporator 8, returning to the compressor 2. This control node of flow of the refrigerant is referred to as "freezing compartment cooling mode." In the freezing compartment cooling mode, the liquid refrigerant is supplied mainly to the freezing compartment evaporator 8 for evaporation so that a cooling air for cooling an atmosphere in a freezing compartment is produced. Accordingly, the atmosphere in the refrigerating compartment is mainly cooled when the refrigerating cycle 1 is set for the refrigerating compartment cooling mode. The atmosphere in the freezing compartment is mainly cooled when the refrigerating cycle 1 is set for the freezing compartment cooling mode. The construction of a body of the above-described refrigerator including the refrigerating and freezing compartments is substantially the same as described in Japanese Patent Application No. 10-119249 filed by the assignee of the present application on Apr. 28, 1998.

Figure 1:
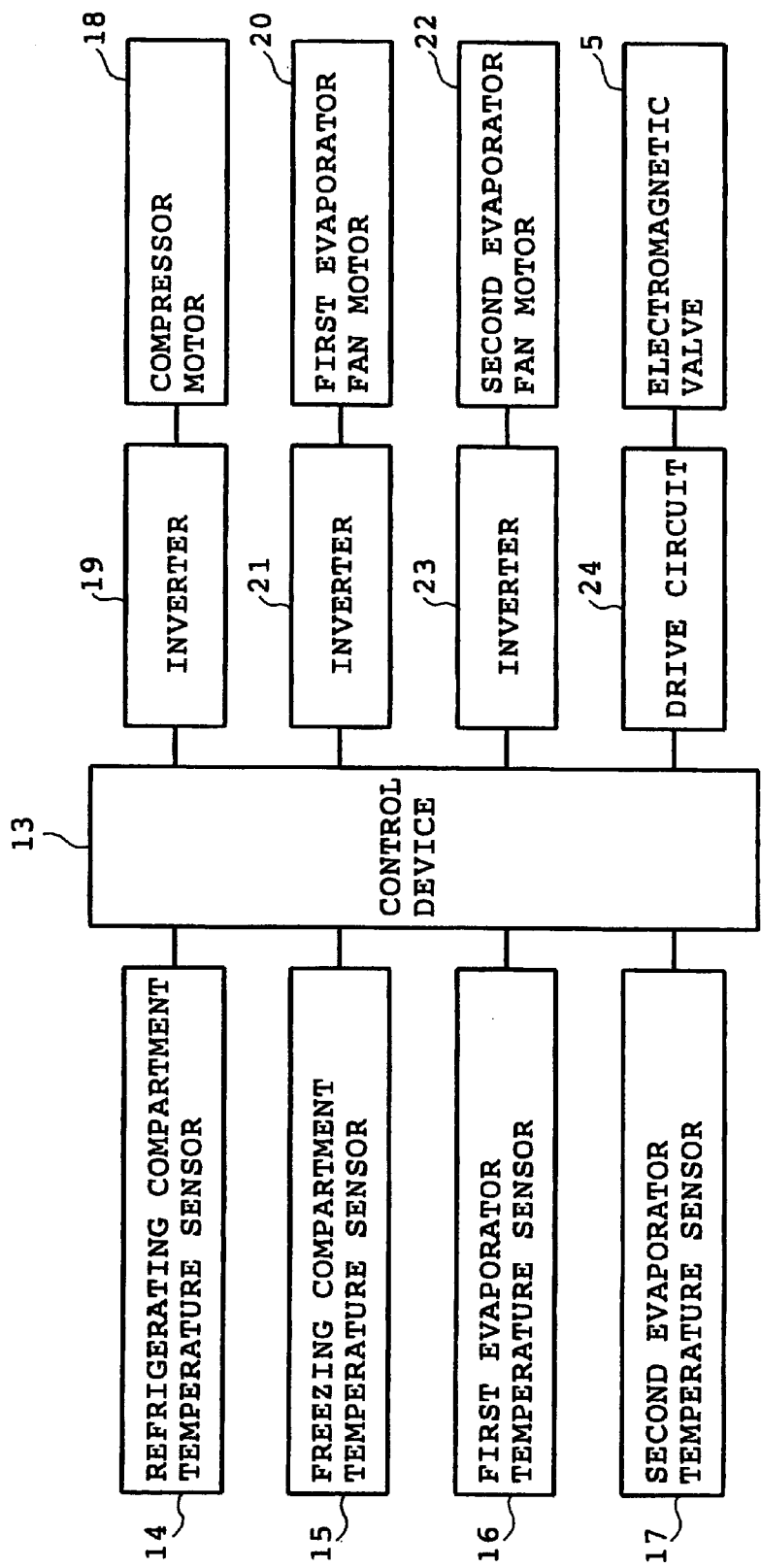
FIG. 1 is a block diagram showing an electrical arrangement of a refrigerator of one embodiment in accordance with the present invention.

Referring now to FIG. 1, an electrical arrangement of the refrigerator provided with the above-described refrigerating cycle 1 is schematically shown. A control device 13 serving as a controller is mainly composed of a microcomputer and performs a controlling operation according to a control program stored in a ROM (not shown). To the control device 13 are connected a refrigerating compartment temperature sensor 14 for detecting a temperature in the refrigerating compartment, a freezing compartment temperature sensor 15 for detecting a temperature in the freezing compartment, a first evaporator temperature sensor 16 for detecting a temperature of the refrigerating compartment evaporator 7, and a second evaporator temperature sensor 17 for detecting a temperature of the freezing compartment evaporator 8. To the control device 13 are also connected an inverter 19 for driving a compressor motor 18, an inverter 21 for driving a fan motor 20 for the refrigerating compartment evaporator 7, and an inverter 23 for driving a fan motor 22 for the refrigerating compartment evaporator 8. A drive circuit 24 for driving the electromagnetic valve 5 is further connected to the control device 13. The fan motors 22 and 23 are provided for supplying cold airs produced by the evaporators 7 and 8 to the refrigerating and freezing compartments respectively.

The control device 13 sets an upper limit temperature (for example, 5° C.) and a lower limit temperature (for example, 2° C.) for a temperature in the refrigerating compartment. The control device 13 also sets an upper limit temperature (for example, −18° C.) and a lower limit temperature (for example, −21° C.) for a temperature in the freezing compartment. On the basis of these set temperatures and input signals from the respective temperature sensors, the control device 13 controls the compressor motor 18, the fan motors 20 and 22 and the electromagnetic valve 5 so that the temperatures in the refrigerating and freezing compartments are in ranges between the set lower and upper limit temperatures respectively.

Figure 3:
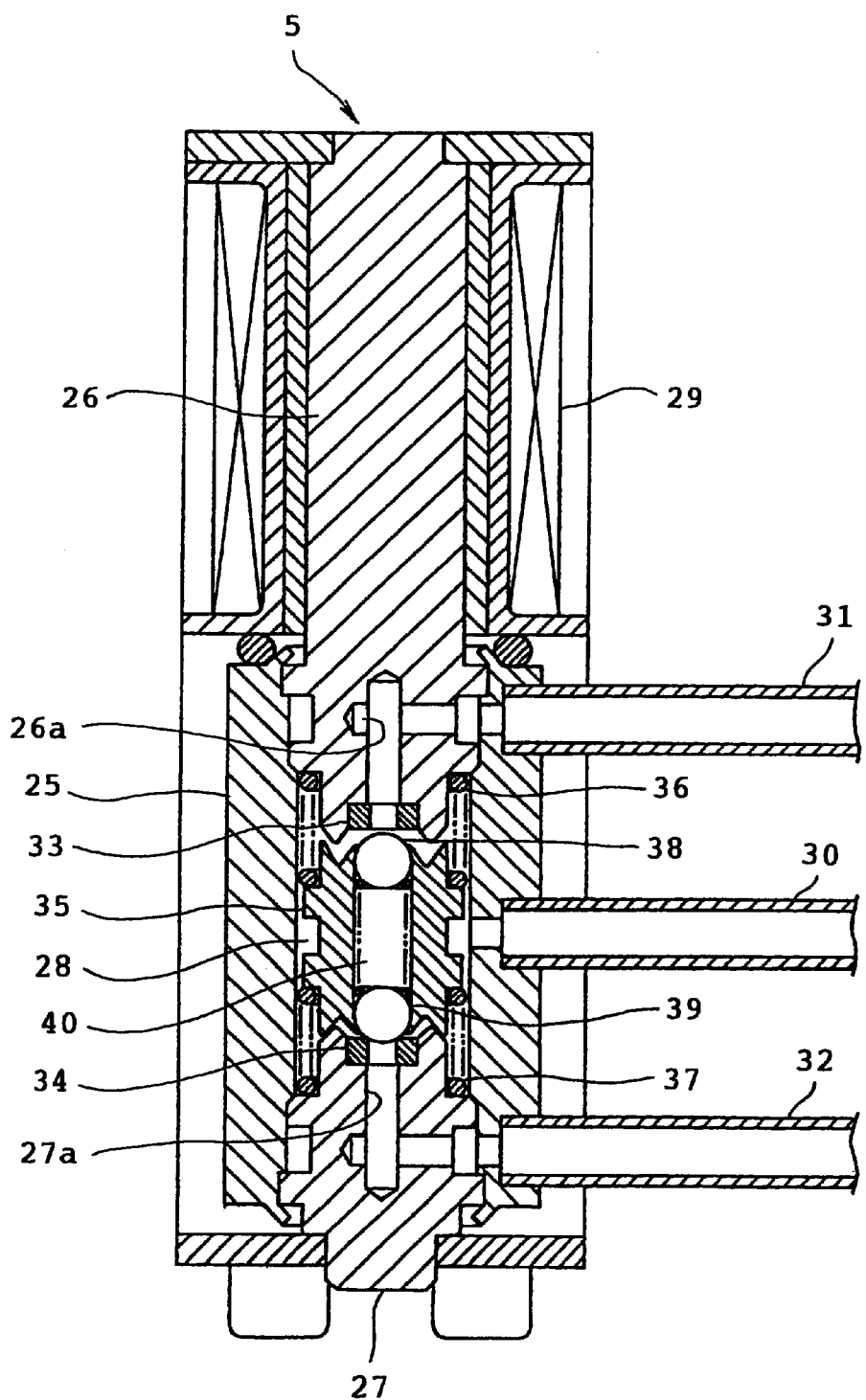
FIG. 3 is a longitudinal section of an electromagnetic valve taken along line 3—3 in FIG. 4.

With respect to the electromagnetic valve 5, a countermeasure for noise reduction is taken by the inventors. The structure of the electromagnetic valve 5 will be described with reference to FIGS. 3 and 4. Referring to FIG. 3, the electromagnetic valve 5 comprises a cylindrical valve body 25 made of a non-magnetic material such as brass. The valve body 25 has both axial ends (upper and lower ends in FIG. 3) with holes into which first and second attracting elements 26 and 27 each made of a magnetic material such as iron are fitted, respectively. A valve chest 28 is defined between the attracting elements 26 and 27 in the valve body 25. A solenoid 29, which is connected to the drive circuit 24, is attached to an outer circumference of the first attracting element 26.

An inlet pipe 30 communicating with the valve chest 28 is provided in an outer circumference of the valve body 25. First and second outlet pipes 31 and 32 are provided over and below the inlet pipe 30 respectively. The first outlet pipe 31 communicate with an upper interior or the valve chest 28 through an axial passage 26a formed in the first attracting element 26. The second outlet pipe 32 communicates with a lower interior of the valve chest 28 through an axial passage 27a formed in the second attracting element 27. Valve seats 33 and 34 each made of a non-magnetic material such as brass are fixed to ends of the first and second attracting elements 26 and 27 at the valve chest 28 side so as to be located at open edges of the passages 26a and 27a, respectively.

In the refrigerating cycle 1 as shown in FIG. 2, the inlet pipe 30 is connected to the refrigerant flow pipe 10 communicating with the drier 4. The first and second outlet pipes 31 and 32 are connected to the refrigerant flow pipe 10 communicating with the first capillary tube 6 and the refrigerant flow pipe 11 communicating with the second capillary tube 12 respectively.

A valve element 35 made of a magnetic material such as iron is provided for axial movement in the valve chest 28. Two coil springs 36 and 37 each serving as an urging element are provided between the valve element 35 and the first and second attracting elements 26 and 27 respectively. The coil springs 36 and 37 have spring constants substantially equal to each other respectively. Two balls 38 and 39 are provided at both axial ends of the valve element 35 respectively. A ball coil spring 40 serving as an urging element is provided between the balls 38 and 39. The ball 38 or 39 abuts the valve seat 33 or 34 to airtightly close the passage 26*a* or 27*a* when a spring force of the coil spring 40 causes the valve element 35 to abut against the first or second attracting element 26 or 27.

Figure 4:
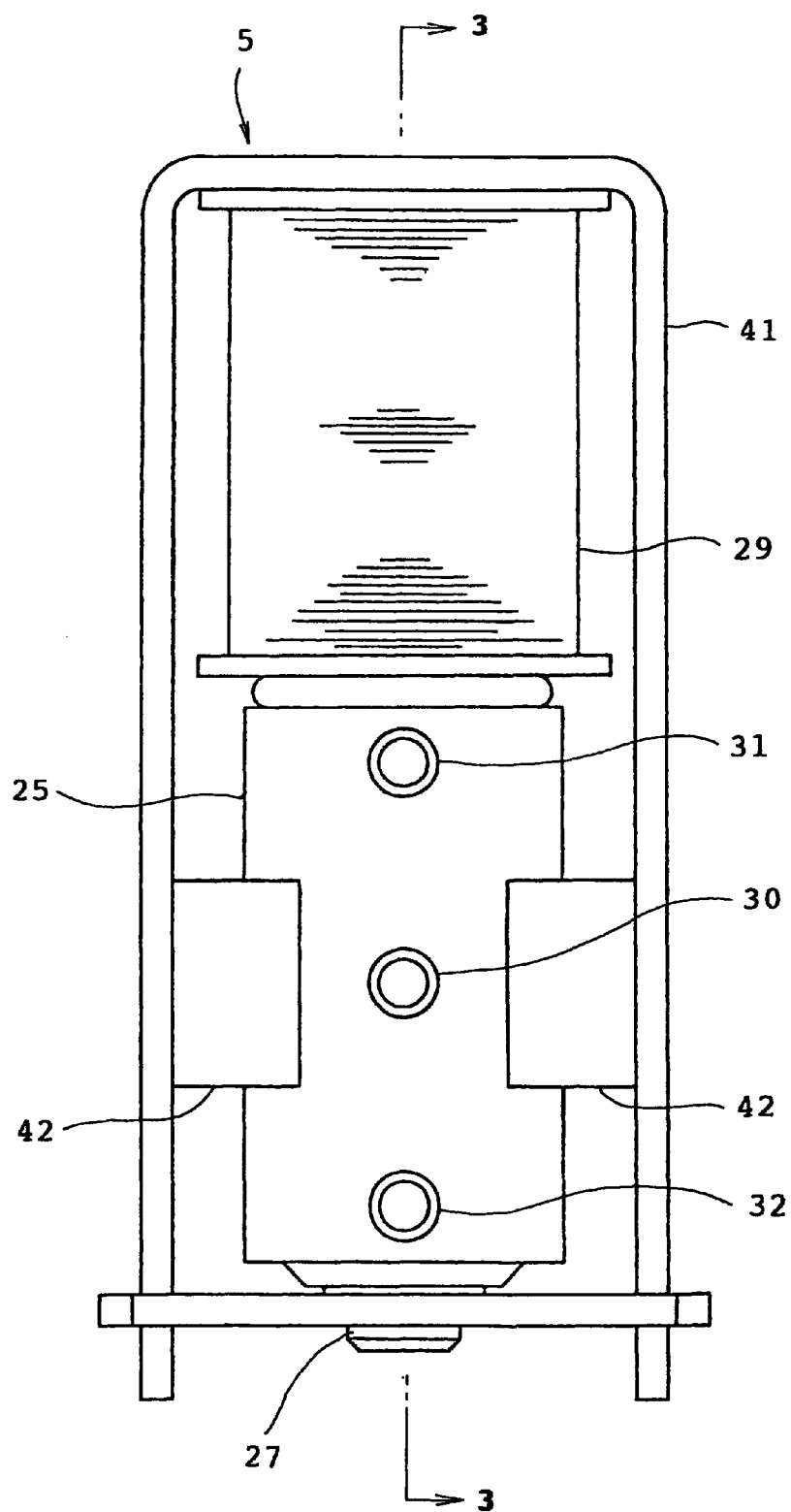
FIG. 4 is a front view of the electromagnetic valve.

Referring to FIG. 4, a generally rectangular housing 41 made of iron is provided so as to enclose the valve element 25 and the solenoid 29. Two permanent magnets 42 are fixed to the housing 41 so as to interpose the valve element 35 therebetween. Each permanent magnet 42 is disposed so that the north pole is located at an end thereof at the housing 41 side and the south pole is located at an end thereof at the valve element 35 side. As a result, a magnetic circuit is formed by the permanent magnet 42, the housing 41, the first attracting element 26, the valve element 35 and the other permanent magnet 42. Another magnetic circuit is formed by the permanent magnet 42, the housing 41, the second attracting element 27, the valve element 35 and the other permanent magnet 42. A magnetic force of the each permanent magnet 42 is set so that the valve element 35 can hold or self-hold an abutting state against the spring force of the coil spring 36 or 37 when abutting the first or second attracting element 26 or 27.

Figure 5:
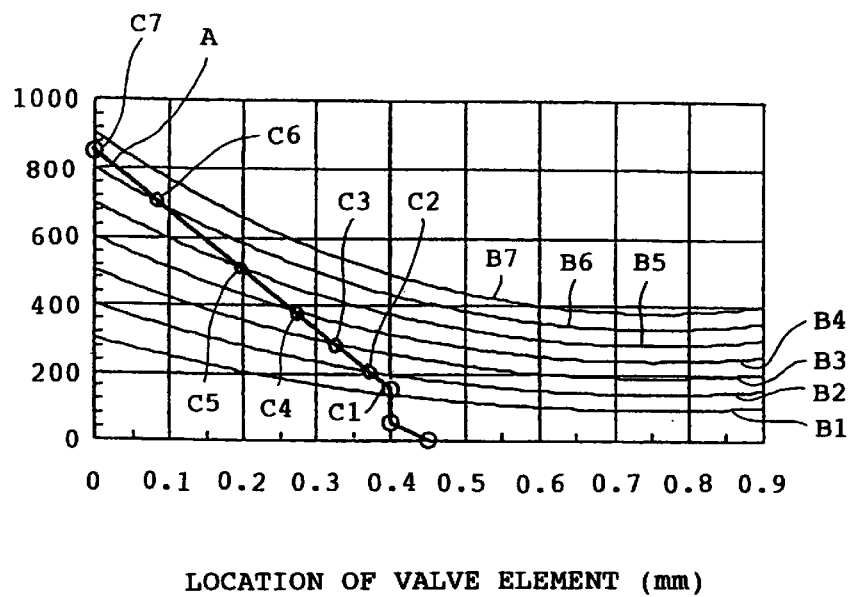
FIG. 5 is a graph showing the relation between the location of a valve element, and the spring force and the magnetic force.

The operation of the refrigerator will now be described. First, the operation of the valve element 35 of the electromagnetic valve 5 will be described with reference to FIGS. 5, 6A and 6B. FIG. 5 shows the relation between the location of the valve element 35, and the spring force and the magnetic force when the valve element is attracted to the first attracting element 26. The location of the valve element is a distance between the first attracting element 26 and the valve element 35. More specifically, the valve element 35 is equidistant from the first and second attracting elements 26 and 27 when the location of the valve element is "0.45 mm." The ball 38 of the valve element 35 is in abutment with the valve seat 33 when the location of the valve element is "0.4 mm." In a range between 0.4 mm and 0, the valve element 35 comes closer to the first attracting element 26 with the ball 38 gradually falling into the valve element. When the location of the valve element is "0," the valve element 35 completely adheres to the first attracting element 26.

The spring force is a composite force of spring forces of the coil springs 36 and 37 and a spring force of the ball coil spring 40. The composite spring force is shown by straight line A in FIG. 5. The magnetic force is a composite force acting between the valve element 35 and the first attracting element 26 magnetized by the permanent magnets 42 and the solenoid 29. The composite magnetic force is shown by curves B1 to B7 in FIG. 5. These curves B1 to B7 show composite forces when the voltage applied to the solenoid 29 is at 0, 2, 4, 6, 8, 10 and 12 volts respectively.

As obvious from FIG. 5, the coil springs 36 and 37 of the electromagnetic valve 5 are set so that an inclination of the straight line A showing the spring force is larger than each of inclinations of the curves B1 to B7 showing the magnetic forces. Accordingly, reference symbols C1 to C7 in FIG. 5 designate the locations where the spring force and the magnetic force are balanced with each other depending upon the magnitude of voltage applied to the solenoid 29. The locations correspond to curves B1 to B7 respectively. FIG. 5 shows that the voltage applied to the solenoid 29 so that the valve element 35 abuts the first attracting element 26 is at 12 volts.

The magnetic force exceeds the spring force when the control device 13 firstly applies a voltage of 2 volts to the solenoid 29. Accordingly, the valve element 35 moves to intersection C2 of the straight line A and curve B2. When the valve element 35 then reaches intersection C2, the magnetic force and the spring force are balanced with each other, so that the valve element 35 is held at intersection C2. When the control device 13 increases the voltage applied to the solenoid 29 to 4 volts, the magnetic force again exceeds the spring force such that the valve element 35 moves to intersection C3 of straight line A and curve B3. Thereafter, the control device 13 sequentially increases the applied voltage to 12 volts in the same manner as described above so that the valve element 35 gradually moves and finally abuts the first attracting element 26.

Figure 6A:
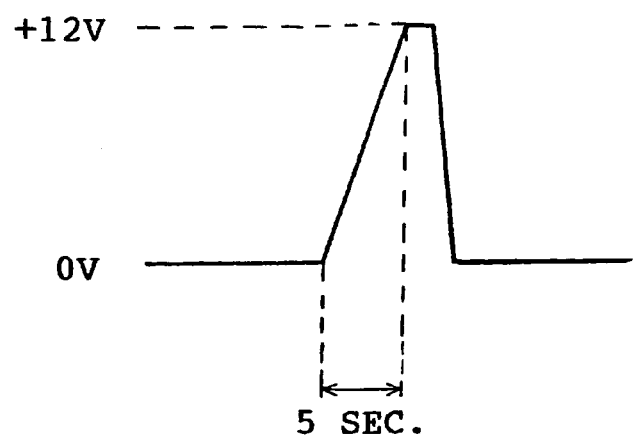
FIGS. 6A and 6B are waveform charts of a voltage applied to a solenoid.

More specifically, the valve element 35 gradually moves to the side of the first attracting element 26 against the spring force when the control device 13 gradually increases the voltage applied to the solenoid 29 so that the spring force acting on the valve element 35 slightly exceeds the magnetic force. As a result, the noise produced by the collision of the valve element 35 against the first attracting element 26 can be reduced. FIG. 6A shows a waveform of the voltage applied to the solenoid 29. When a rise time is excessively long, a consumed power is increased such that the solenoid 29 heats up, whereupon the temperature of the solenoid is increased. In view at this problem, the rise time is set for 5 seconds in the embodiment.

After the valve element 35 has abutted the first attracting element 26, the permanent magnets 42 hold the valve element 35 in abutment therewith. In the electromagnetic valve 5, a flow passage from the inlet pipe 30 via the valve chest 28 and the passage 27*a* to the second outlet pipe 32 (a second refrigerant passage) is opened. At this time, a flow passage from the inlet pipe 30 via the valve chest 28 and the passage 26*a* to the first outlet pipe 31 (a first refrigerant passage) is closed. When a negative voltage as shown in FIG. 6B is applied to the solenoid 29, the valve element 35 is held in abutment with the second attracting element 27, so that the first refrigerant passage is opened and the second refrigerant passage is opened in the electromagnetic valve 5.

The drive of the electromagnet 29 will now be described with reference to timing charts of FIGS. 7A to 7H. The electromagnetic valve 5 is in the state switched to the second outlet side in a period between time t1 and time t2. The compressor motor 18 and the fan motors 20 and 22 are off (stop mode). At this time, the temperature in the refrigerating compartment detected by the temperature sensor 14 is at or below an upper limit temperature of the refrigerating compartment. The temperature in the freezing compartment detected by the temperature sensor 15 is at or below an upper limit temperature of the freezing compartment. Substantially no sound due to operation of the refrigerator is produced in this period. Accordingly, when the electromagnetic valve 5 is switched, a noise due to the switching operation of the electromagnetic valve is offensive or abnormal to the ears of the user. In view of this, the control device 13 does not switch the electromagnetic valve 5 in this period of stop mode.

The control device 13 switches the operation mode from the stop mode to the refrigerating compartment cooling mode when the temperature in the refrigerating compartment gradually increases and exceeds the upper limit temperature of the refrigerating compartment at time t2. The control device 13 then controls the inverter 19 so that the compressor motor 18 is driven. The control device 13 further controls the inverter 21 so that the fan motor 20 for refrigerating compartment evaporator 7 is driven. In this case, the refrigerant flowing into the electromagnetic valve 5 is in the gaseous state or both in the gaseous and liquid states for time Ta (10 to 30 seconds, for example) or until the speed of the compressor motor 18 is increased to such a stage that sufficient compression and condensation of the refrigerant by the compressor 2 and the condenser 3 respectively are established. Further, a speed of the fan motor 20 of the refrigerating compartment evaporator 7 is gradually increased so as to be stable upon lapse of time Tb (4 to 6 seconds) from the start of drive.

Figure 6B:
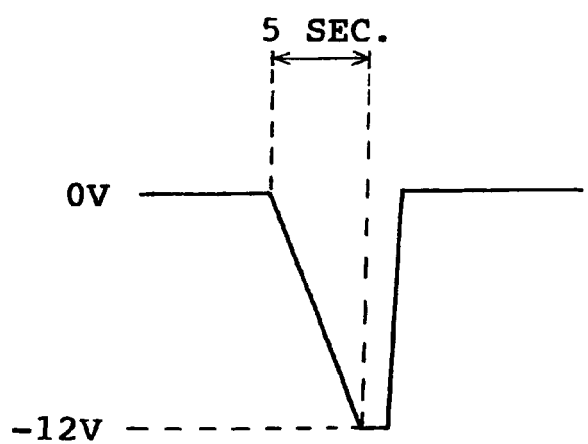

The control device 13 then applies a voltage as shown in FIG. 6B via the drive circuit 24 to the solenoid 29 of the electromagnetic valve 5 at time t3 when either longer one of times Ta and Tb starts at time t2 and expires. As a result, the electromagnetic valve 5 is switched from the second outlet side to the first outlet side so that the refrigerant flows through the first refrigerant passage. The noise due to the switching operation of the electromagnetic valve 5 can be reduced as follows when the control device 13 switches the electromagnetic valve 5 at time t3. First, the electromagnetic valve 5 is switched after the liquid refrigerant flows in the electromagnetic valve 5. As a result, the liquid refrigerant serves as a buffer against the movement of the valve element 35. In other words, when the valve element 35 in abutment with the first attracting element 26 moves toward the second attracting element 27, the liquid refrigerant in the valve chest 28 is forced out through the passage 27a into the second outlet pipe 32. At this time, the liquid refrigerant applies to the valve element 35 a force against the movement of the refrigerant. Accordingly, the speed at which the valve element 35 collides with the second attracting element 27 is reduced. Consequently, the noise due to the switching operation of the valve element 35 can be reduced. An experiment carried out by the inventors shows that when the electromagnetic valve 5 is switched while the liquid refrigerant is flowing in the valve, the noise due to the switching operation is reduced by a maximum of 9 dB(A) at a location 10 cm away from the valve 5 as compared with a case where the valve is switched while the gaseous refrigerant is flowing in the valve.

Secondly, the electromagnetic valve 5 is switched after the speed of the compressor motor 18 is increased to a certain level and the speed of the fan motor 20 for the refrigerating compartment evaporator 7 becomes stable. As a result, a masking effect is obtained. More specifically, the noise due to the switching operation of the electromagnetic valve 5 is masked by a background noise including a sound due to the operation of the compressor 2 and a sound due to the operation of the fan (not shown) for the refrigerating compartment evaporator 7 (for example, wind whistle) consequently, the noise due to the switching operation of the switching valve can be prevented from being accepted as an offensive or abnormal noise to the ears of the user.

Thereafter, the atmosphere in the refrigerating compartment is cooled such that the temperature in the compartment is at or below the lower limit temperature thereof at time t4. The control device 13 then switches the operation mode from the refrigerating compartment cooling mode to the freezing compartment cooling mode on condition that the temperature in the freezing compartment is higher than the lower limit temperature thereof. The control device 13 stops the fan motor 20 of the evaporator 7 and simultaneously controls the inverter 23 so that the fan motor 22 of the freezing compartment evaporator 8 is driven.

In this case, too, the control device 13 applies the voltage as shown in FIG. 6A via the drive circuit 24 to the solenoid 29 of the electromagnetic valve 5 at time t5 after the speed of the fan motor 22 has become stable. As a result, the electromagnetic valve 5 is switched from the first outlet side to the second outlet side so that the refrigerant flows through the second refrigerant passage. When the control device 13 switches the electromagnetic valve 5 at time t5, the noise due to the switching operation of the electromagnetic valve 5 is masked by the sound due to the operation of the compressor 2 and the sound due to the operation of the fan (not shown) for the freezing compartment evaporator 8 in the same manner as described above. Further, the compressor motor 18 is being driven at time t5 so that the refrigerant in the liquid phase is flowing in the electromagnetic valve 5. Accordingly, the liquid refrigerant serves as the buffer against the movement of the valve element 35 due to energization to the electromagnetic valve 5, so that the noise due to the switching operation of the valve 5 is reduced. Thereafter, when switching the operation made from the freezing compartment cooling node to the refrigerating compartment cooling mode at time t6, too, the control device 13 switches the electromagnetic valve 5 in the same manner as described above.

According to the foregoing embodiment the control device 13 switches the electromagnetic valve 5 after the liquid refrigerant has started to flow in the valve 5. As a result, since the liquid refrigerant serves are the buffer against the movement of the valve element 35, the noise due to the switching operation of the valve 5 can be reduced. Further, the control device 13 switches the electromagnetic valve 5 after the compressor motor 18 has been driven and the speed of the fan motor 20 or 22 has become stable. As a result, the noise due to the switching operation of the valve 5 is masked by the sound due to the operation of the compressor 2 and the sound due to the operation of the fan for the evaporator 7 or 8, namely, the background noise.

Further, in the foregoing embodiment, the electromagnetic valve 5 made by the noise reducing technique previously developed by the inventors, and the control device 13 controls the rise time of a drive voltage of the solenoid 29 of the valve 5. Consequently, the noise due to the collision of the valve element 35 of the electromagnetic valve 5 against the first or second attracting element 26 or 27 can be reduced and accordingly, the noise due to the switching operation of the valve 5 can further be reduced as compared with refrigerators employing other types of electromagnetic valves.

Further, the valve element 35 of the electromagnetic valve 5 is held in abutment with the first or second attracting element 26 or 27 by the action of the magnetic field produced by the permanent magnets 42 even when no voltage is applied to the solenoid 29. Accordingly, the voltage is applied to the electromagnetic valve 5 only when the direction of flow of the refrigerant is changed, namely, only when the valve element 35 is moved. Consequently, the electric power consumption can be saved. Additionally, the first and second outlet pipes 31 and 32 are disposed in the outer circumference of the valve body 25 so as to be substantially perpendicular to the direction of movement of the valve element 35. Consequently, the size of the electromagnetic valve 5 can be reduced.

The control device 13 may switch the electromagnetic valve 5 at any time irrespective of an operational state of the fan for the evaporator 7 or 8 after the liquid refrigerant has flown in the electromagnetic valve 5. Further, the control device 13 may switch the electromagnetic valve 5 at any time irrespective of the state of the refrigerator in the valve 5 after the compressor motor 18 has been driven and the speed of the fan motor 20 or 22 has become stable. Additionally, the control device 13 may switch the electroromagnetic valve 5 either after the compressor motor 18 has been driven or after the speed of the fan motor 20 or 22 has become stable.

The refrigerating cycle 1 should not be limited to the above-described one only if it is provided with a switching valve switching the flow of refrigerant selectively to one of a plurality of refrigerant passages. For example, the refrigerating cycle may be provided with a switching valve switching the flow of refrigerant to one of three or more refrigerating passages.

Further, the construction of the switching valve should not be limited to the above-described one. The valve element may axially move straightforward or may be rotated as disclosed in Japanese Utility Model Publication No. 5-12867A published on Feb. 19, 1993. Further, the switching valve should not be limited to the electromagnetic three-way valve. An electromagnetic two-way valve maybe used instead. Additionally, the switching valve should not be limited to the electromagnetic type.

The foregoing description and drawings are merely illustrative of the principles of the present invention and are not to be construed in a limiting sense. Various changes and modifications will become apparent to those of ordinary skill in the art. All such changes and modifications are seen to fall within, the scope of the invention as defined by the appended claims.

I claim:

1. A refrigerator comprising:
   a compressor;
   a condenser for liquefying a refrigerant discharged from the compressor;
   a plurality of refrigerant passages provided at a downstream side of the condenser;
   a switching valve switching a flow of the refrigerant to one of the refrigerant passages so that the refrigerant liquefied by the condenser flows through the switched refrigerant passage, the switching valve including a valve body; and
   a controller controlling the switching valve so that the switching valve performs a switching operation upon expiration of a period of time sufficient for an interior of the valve body of the switching valve to be filled with the liquid refrigerant after start of the compressor.

2. A refrigerator according to claim 1, further comprising:
   a refrigerating compartment;
   a first evaporator for cooling an atmosphere in the refrigerating compartment;
   a freezing compartment;
   a second evaporator for cooling an atmosphere in the freezing compartment, and
   wherein the refrigerant passages include a first refrigerant passage through which the refrigerant is supplied to the first evaporator and a second refrigerant passage through which the refrigerant is supplied to the second evaporator.

3. A refrigerator according to claim 2, wherein the switching valve further includes:
   first and second attracting elements provided in the valve body so as to be spaced away from each other so that a valve chest is defined therebetween;
   a valve element provided in the valve chest;
   an urging element provided in the valve chest so as to urge the valve element, the valve element closing the first refrigerant passage and opening the second refrigerant passage when moved to the first attracting element side, the valve element opening the first refrigerant passage and closing the second refrigerant passage when moved to the second attracting element side; and
   a solenoid producing a magnetic field causing the valve element to move against an urging force of the urging element,
   wherein when a predetermined voltage is applied to the solenoid, a rate of change of the urging force acting on the valve element with the movement of the valve element is larger than a rate of change of a magnetic force acting between the first attracting element and the valve element with the movement of the valve element, and
   wherein the controller controls a rise time of the voltage applied to the solenoid.

4. A refrigerator according to claim 3, wherein the urging element includes:
   a first urging element provided between the valve element and the first attracting element and a second urging element provided between the valve element and the second attracting element, and
   wherein the switching valve further includes a permanent magnet forming magnetic circuits via the first and second attracting element respectively, thereby holding the valve element in abutment with the first or second attracting element.

5. A refrigerator according to claim 3, wherein the controller sets a rise time allowing the valve element to gradually move against the urging force of the urging element.

6. A refrigerator according to claim 3, further comprising pipes provided on the valve body so as to be substantially perpendicular to a direction of movement of the valve element, the pipes communicating the first and second refrigerant passages to the valve chest respectively.

7. A refrigerator comprising:
   a compressor;
   a condenser for liquefying a refrigerant discharged from the compressor;
   a plurality of refrigerant passages provided at a downstream side of the condenser;
   a switching valve switching a flow of the refrigerant to one of the refrigerant passages so that the refrigerant liquefied by the condenser flows through the switched refrigerant passage, the switching valve including a valve body;
   an evaporator provided across the refrigerant passages to evaporate the liquid refrigerant;
   a fan for supplying a cold air produced by the evaporator; and
   a controller controlling the switching valve so that the switching valve performs a switching operation upon expiration of a period of a predetermined period of time after start of the compressor or during operation of the fan.

8. A refrigerator according to claim 7, wherein the switching valve includes a valve body and the controller controls the switching valve so that the switching valve performs the switching operation upon expiration of a period of time sufficient for an interior of the valve body of the switching valve to be filled with the liquid refrigerant after start of the compressor while the compressor or fan is in operation.

9. A refrigerator according to claim 7, wherein while the fan is in operation, the controller controls the switching valve so that the switching valve performs the switching operation after an operation of the fan is rendered stable.

10. A refrigerator according to claim 8, wherein while the fan is in operation, the controller controls the switching valve so that the switching valve performs the switching operation after an operation of the fan is rendered stable.

11. A refrigerator according to claim 7, further comprising a refrigerating compartment and a freezing compartment, wherein the evaporator includes a first evaporator for cooling an atmosphere in the refrigerating compartment and a second evaporator for cooling an atmosphere in the freezing compartment, wherein the fan includes a first fan for supplying to the refrigerating compartment a cold air produced by the first evaporator and a second fan for supplying to the freezing compartment a cold air produced by the second evaporator, and wherein the refrigerant passages include a first refrigerant passage through which the retrigerant is supplied to the first evaporator and a second refrigerant passage through which the refrigerant is supplied to the second evaporator.

12. A refrigerator according to claim 11, wherein the switching valve further includes:

first and second attracting elements provided in the valve body so as to be spaced away from each other so that a valve chest is defined therebetween;

a valve element provided in the valve chest;

an urging element provided in the valve chest so as to urge the valve element, the valve element closing the first refrigerant passage and opening the second refrigerant passage when moved to the first attracting element side, the valve element opening the first refrigerant passage and closing the second refrigerant passage when moved to the second attracting element side; and a solenoid producing a magnetic field causing the valve element to move against an urging force of the urging element, wherein when a predetermined voltage is applied to the solenoid, a rate of change of the urging force acting on the valve element with the movement of the valve element is larger than a rate of change of a magnetic force acting between the first attracting element and the valve element with the movement of the valve element, and wherein the controller controls a rise time of the voltage applied to the solenoid.

13. A refrigerator according to claim 12, wherein the urging element includes:

a first urging element provided between the valve element and the first attracting element and a second urging element provided between the valve element and the second attracting element, and wherein the switching valve further includes a permanent magnet forming magnetic circuits via the first and second attracting elements respectively, thereby holding the valve element in abutment with the first or second attracting element.

14. A refrigerator according to claim 12, wherein the controller sets a rise time allowing the valve element to gradually move against the urging force of the urging element.

15. A refrigerator according to claim 12, further comprising pipes provided on the valve body so as to be substantially perpendicular to a direction of movement of the valve element, the pipes communicating the first and second refrigerant passages to the valve chest respectively.

16. A refrigerator according to claim 8, further comprising a refrigerating compartment and a freezing compartment, wherein the evaporator includes a first evaporator for cooling an atmosphere in the refrigerating compartment and a second evaporator for cooling an atmosphere in the freezing compartment, wherein the fan includes a first fan for supplying to the refrigerating compartment a cold air produced by the first evaporator and a second fan for supplying to the freezing compartment a cold air produced by the second evaporator, and wherein the refrigerant passages include a first refrigerant passage through which the refrigerant is supplied to the first evaporator and a second refrigerant passage through which the refrigerant is supplied to the second evaporator.

17. A refrigerator according to claim 16, wherein the switching valve further includes:

first and second attracting elements provided in the valve body so as to be spaced away from each other so that a valve chest is defined therebetween;

a valve element provided in the valve chest;

an urging element provided in the valve chest so as to urge the valve element, the valve element closing the first refrigerant passage and opening the second refrigerant passage when moved to the first attracting element side, the valve element opening the first refrigerant passage and closing the second refrigerant passage when moved to the second attracting element side; and a solenoid producing a magnetic field causing the valve element to move against an urging force of the urging element, wherein when a predetermined voltage is applied to the solenoid, a rate of change of the urging force acting on the valve element with the movement of the valve element is larger than a rate of change of a magnetic force acting between the first attracting element and the valve element with the movement of the valve element, and wherein the controller controls a rise time of the voltage applied to the solenoid.

18. A refrigerator according to claim 17, wherein the urging element includes:

a first urging element provided between the valve element and the first attracting element and a second urging element provided between the valve element and the second attracting element, and wherein the switching valve further includes a permanent magnet forming magnetic circuits via the first and second attracting elements respectively, thereby holding the valve element in abutment with the first or second attracting element.

19. A refrigerator according to claim 17, wherein the controller sets a rise time allowing the valve element to gradually move against the urging force of the urging element.

20. A refrigerator according to claim 17, further comprising pipes provided on the valve body so as to be substantially perpendicular to a direction of movement of the valve element, the pipes communicating the first and second refrigerant passages to the valve chest respectively.

* * * * *